Sept. 12, 1967  D. KIRK  3,341,108
EASY OPENING BAG
Filed Jan. 20, 1964  3 Sheets-Sheet 1
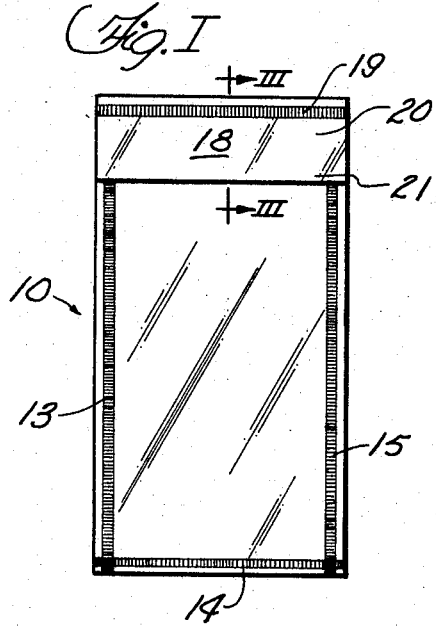
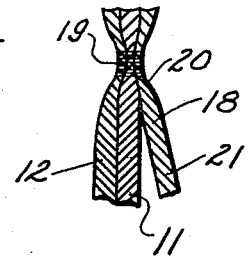
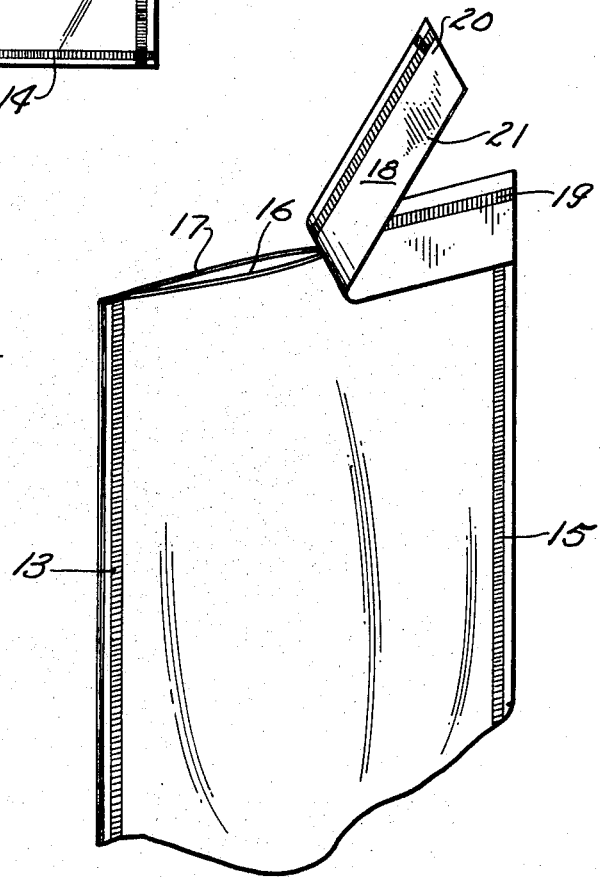
INVENTOR.
Douglas Kirk
BY Pendleton, Neuman,
Seibold & Williams
Attorneys

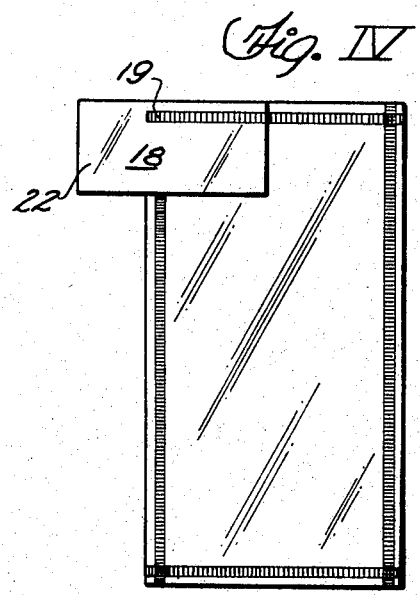
Fig. IV
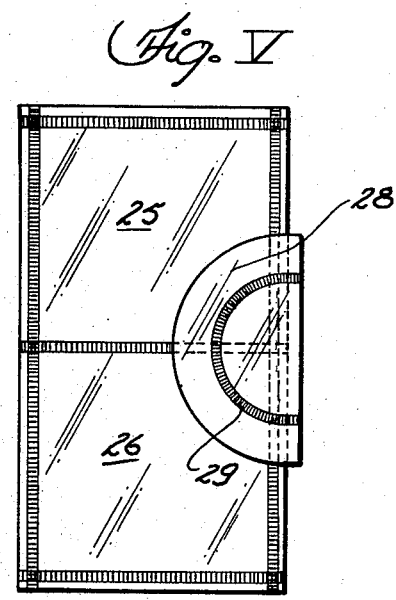
Fig. V
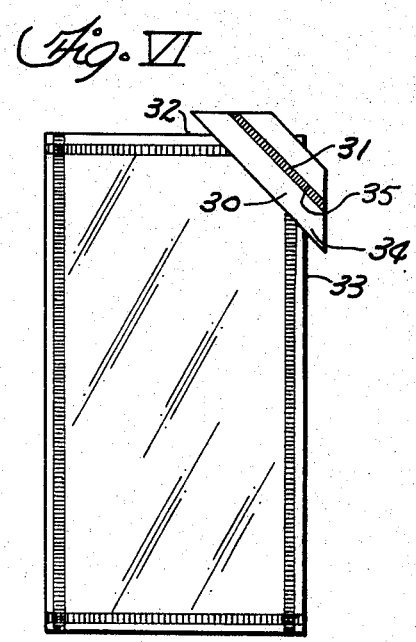
Fig. VI
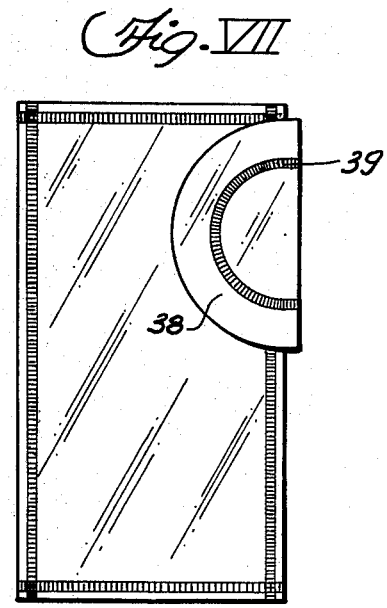
Fig. VII
INVENTOR.
Douglas Kirk
BY Pendleton, Neuman,
Seibold & Williams
Attorneys Sept. 12, 1967 D. KIRK 3,341,108
EASY OPENING BAG
Filed Jan. 20, 1964 3 Sheets-Sheet 3
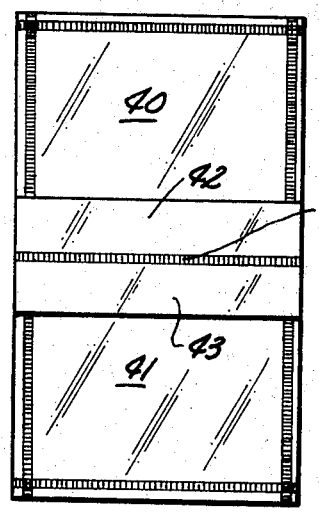
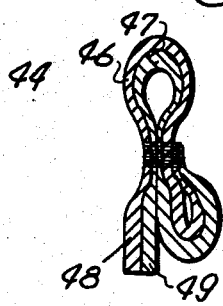
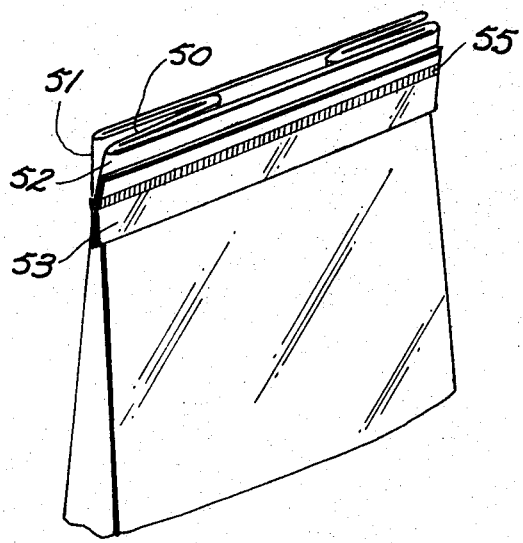
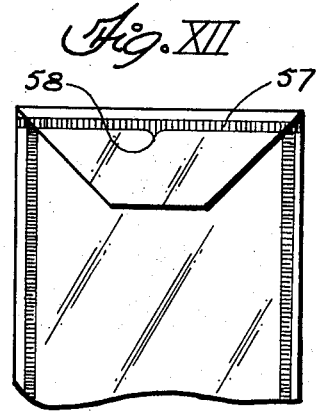
INVENTOR.
Douglas Kirk
BY Pendleton, Neuman,
Seibold & Williams
Attorneys 3,341,108
EASY OPENING BAG
Douglas Kirk, Barrington, Ill., assignor to The Quaker Oats Company, Chicago, Ill., a corporation of New Jersey
Filed Jan. 20, 1964, Ser. No. 338,931
5 Claims. (Cl. 229—66)

This invention relates to bags having means for easy opening thereof and more particularly to bags having tear means which may be pulled to effect quick opening of the bag to any desired extent, including the full width thereof.

Bags made of heat-sealable plastic such as polyethylene find widespread use in packaging various liquid and solid materials of both perishable and durable nature. Such packages can be formed from a sheet of thermoplastic material by folding the sheet and applying sufficient heat and pressure to the overlapping edges of the folded sheet to form fused areas. Similarly, separate front and back panels of thermoplastic material can be aligned and fused together adjacent the respective edges thereof to form a bag. The thermoplastic materials utilized for such packages serve to make a strong package which is not readily susceptible to tearing or penetration by foreign elements.

These properties of the thermoplastic materials are, of course, necessary and desirable in order to adequately protect the contents of the package and to avoid contamination thereof, but on the other hand render it difficult to open the package. It is generally very difficult to initiate a tear in the thermoplastic materials and a tear once started frequently tends to follow an erratic course, often resulting in the particulate or liquid contents of the bag being spilled. To facilitate opening of this type of package, tear tabs have been employed on a wall of the bag as an integral part thereof. By removing the tear tabs a hole is provided in the wall of the bag through which the contents can be removed. The size of the opening through which the contents of the package are removed is governed by the size of the tear tab which is a definite disadvantage in many instances.

Internal tear tabs have also been employed on thermoplastic packages. However, internal tear tabs have a major disadvantage in that the end of the tab must protrude through the wall, usually at the seam. Such a structure presents numerous problems in maintaining a satisfactory seal at the point where the tape protrudes through the wall.

It is a principal object of this invention to provide a new and improved bag which can be tightly sealed and which has means for quick and easy opening thereof whereby the bag can be opened to any desired extent, including the full width thereof.

It is a further object of the invention to provide a new and improved bag made of heat-fusible materials which is opened by pulling a convenient tear strip whereby tearing of the heat-fusible material is easily initiated and after initiation the tear follows a predetermined course.

Another object of the invention is to provide a bag made of thermoplastic or other heat-fusible material which is opened by pulling a convenient tear strip, whereby tearing of the heat-fusible material is initiated at a desired location on the bag with the tear following a predetermined course, thereby permitting an opening to be formed in the bag at a desired location.

A still further object of the invention is to provide a new and improved bag wherein the entire top of the bag can be quickly and easily removed by pulling a tear strip with the tear following a predetermined course.

Still another object of the invention is to provide a new and improved bag made of heat-fusible materials wherein closure of the bag is effected by heat sealing with the said heat seal intimately uniting a tear strip with the plurality of panels forming the bag enclosure which receives the item to be packaged.

Other objects and advantages of the invention will be apparent from the following detailed description.

In accordance with the present invention, a bag is formed of a plurality of panels, including a front and back panel, which are composed of heat-fusible or thermoplastic materials. The panels, when joined together, form an enclosure which receives the items to be packaged. A tear strip formed of a heat-fusible material is welded or heat sealed to all of the panels of the bag at the location where an opening in the bag is desired. The heat seal or weld which integrally joins the tear strip to the panels forming the bag enclosure can be curved or straight so as to define an opening of any desired shape. Preferably the heat seal extends to at least one edge of the bag. The length of the heat seal depends upon the size of the opening desired in the bag and it can extend either partially or fully across the width or length of the bag to permit opening as is desired. The tear strip is provided with a free grip portion which can be gripped manually and pulled away from the bag to open it.

The invention will be further described with reference to the accompanying drawings in which:

FIGURE I is in elevational view of a bag embodying the novel features of the invention.

FIG. II is a perspective view of the bag shown in FIG. I with the tear strip partially torn away.

FIG. III is an enlarged fragmentary cross-sectional view taken on the line III—III of FIG. I.

FIG. IV is a bag similar to that shown in FIG. I in which the tear strip extends only partially across the width of the bag and in which a grip tab portion extends beyond a side edge of the bag.

FIG. V is a further embodiment of the invention in which a tear strip is integrally joined to two separate bag enclosures by means of a curved heat seal or weld whereby upon removal of the tear strip an opening is obtained in both bag enclosures.

FIG. VI is a still further embodiment of the invention in which a tear strip is integrally joined to panels forming a bag enclosure by a heat seal or weld in such manner that upon removal of the tear strip an opening is provided at the corner of the bag which facilitates pouring of the contents from the bag.

FIG. VII is an embodiment of the invention in which a tear strip is integrally joined to panels forming a bag enclosure by a heat seal or weld in such manner that upon removal of the tear strip an opening is provided at one side of the bag which facilitates pouring of the contents from the bag.

FIG. VIII is a still further embodiment of the invention in which two separate bag enclosures have tear strips joined thereto by a single heat seal or weld whereby each of the bag enclosures can be opened separately by removal of the appropriate tear strip.

FIGS. IX and X illustrate an embodiment of the invention in which the tear strip which is joined to the panels of the bag is formed from a flap portion of the panels themselves.

FIG. XI illustrates an embodiment of the invention in which gussets are formed in the panels forming the bag and heat sealed in accordance with the invention.

FIG. XII illustrates an embodiment of the invention in which a heat weld is formed in such manner so as to provide tear initiation means intermediate its length.

Referring to FIGS. I through III, a bag 10, illustrating one embodiment of the invention, comprises two generally rectangular front and back panels 11 and 12 lying face to face and fused together adjacent the respective edges by heat seals 13, 14 and 15. The bag is composed of a suitable heat-fusible material such as polyethylene, polypropylene, polyvinyl chloride, cellulosic films and the like.

Heat seals 13, 14 and 15 are formed in conventional manner by applying sufficient heat and pressure to the front and back panels to cause them to fuse together. The panels 11 and 12 are preferably, but not necessarily, aligned in face-to-face relationship with the peripheral edges thereof substantially coincident so as to form a neat package with the elimination of projecting flaps. After joining the two panels 11 and 12 together along heat seals 13, 14 and 15, the package can be filled with the items to be packaged.

In accordance with the present invention, the bag, after being filled, is closed by joining the open end portions or lips 16 and 17 of the bag with a separate strip 18 of thermoplastic material. This separate strip 18 of thermoplastic material can be made of any suitable material which is capable of being welded to the bag 10. The strip 18 is placed adjacent and substantially coincident with lips 16 and 17 at the open end of the bag and heat sealing transversely of the bag is accomplished along the line 19 as indicated best in FIG. I. Heat sealing along line 19 is carried out with any suitable apparatus utilizing sufficient heat and pressure to intimately unite the upper portion 20 of strip 18 and the front panel 11 and back panel 12 of the bag in a unitary 3-ply weld. The lower portion 21 of the strip remains free and unattached from the bag and constitutes a grip tab. Depending upon the size of the bag and the particular thermoplastic or heat sealable material forming the bag panels, the width of the tab 21 will vary, but is generally ½ to ¾ inch in width so as to facilitate gripping thereof. The strip 18 is preferably attached to the lips 11 and 12 relatively near the periphery thereof for purposes of economy and greater bag capacity. The strip 18 can be of sufficient length to be substantially coterminous with the sides of the bag or it can extend beyond the sides thereof to provide a projecting grip tab portion 22 as shown in FIG. IV.

To open the bag, the strip 18 is gripped at its free end 21 or 22 and pulled up and away from the bag 10. Because of the greater strength of the 3-ply construction forming heat seal 19, the tear initiates and progresses along the lower edge of the heat seal line 19 as shown in FIG. II. The tear strip itself is of about equal or greater strength than the combined strength of the panels forming the bag enclosure. This eliminates the possibility of the tear strip being stripped from the bag without tearing of the panels forming the bag enclosure.

In FIG. II, the tear strip extends transversely and completely across the bag enabling the bag to be opened the full width thereof. In FIG. IV the tear strip extends only partially across the width of the bag with a corresponding reduction in the size of the bag opening.

FIG. V illustrates an embodiment of the invention wherein two separate bag enclosures 25 and 26, which share in common a tear strip 28, are joined thereto by curved heat seal line 29. The curved heat seal line 29 joins tear strip 28 to all of the panels forming the respective bag enclosures 25 and 26 and when the tear strip is completely removed an opening is formed in both bags. This structure is particularly desirable for packaging pre-measured quantities of substances which must be packaged separately but which are subsequently used together, such as, for example, chemically reactive materials, baking ingredients and so forth. In this structure it is to be noted that the curved heat seal line 29 is the only 3-ply weld which traverses the bags and which defines the shape of the bag openings. For satisfactory operation and ease in opening, it is important that no 3-ply heat seal lines or welds cross the heat seal line 29 along which the tear progresses to form the bag opening. The heat seal lines shown by the dotted line is a 2-ply weld joining the front and back panels forming the bags 25 and 26 and does not interfere with the tear which follows the curved 3-ply weld 29.

FIG. VI illustrates a bag formed in accordance with the invention in which a tear strip 30 is angularly disposed at a corner of the bag. A heat seal line 31 extending diagonally intersects the edges 32 and 33 of the bag enclosure. Upon pulling of the grip tab portion 34, a tear is initiated and progresses along the lower edge 35 of the heat seal 31 thereby forming an opening at the corner of the bag. It will be noted that the angle of incidence of the tear is less than 90°, thereby greatly facilitating initiation of the tear. For ease in initiating a tear it is preferred that the angle of incidence of the tear be not more than 90°.

The embodiment of the invention shown in FIG. VII illustrates the formation of a pour opening at one side of the bag enclosure rather than at a corner thereof. To form this opening a tear strip 38 is joined to the panels forming the bag by a curved heat seal line 39 having both ends thereof terminating at the same side of the bag enclosure. Normal pulling of the tear strip 38 initiates a tear along the bottom of the curved heal seal line 39 with formation of a pour opening in one side of the bag.

FIG. VIII shows two twin bag enclosures 40 and 41 having the respective tear strips 42 and 43 integrally joined to the panels thereof by a common heat seal line or weld 44. Each of the bags 40 and 41 can be separately opened along the heat seal line 44 by pulling of the appropriate tear strip without disturbing the seal of the twin package.

FIGS. IX and X illustrate a bag embodying the features of the invention in which the tear strip is formed from a projecting flap portion of the panels forming the bag enclosure. In FIG. IX, the projecting flaps 46 and 47 of the bag panels 48 and 49 are folded in the shape of an "S" and in FIG. X, a double fold of the projecting flaps forms the tear strip. In this embodiment of the invention it is necessary that two plies of the flap or a double fold be employed to form the tear strip.

FIG. XI illustrates a bag having a gusset portion 50 formed from the projecting flaps 51 and 52 of the bag panels. After forming the gussets, a tear strip 53 is integrally joined to the gusset portion by means of a heat seal 55 in accordance with the invention.

In the above preferred embodiments, the heat seal or weld joining the bag panels extends to at least one end of the bag enclosure with this point constituting a natural tear initiation means by virture of the inherent concentration of force which exists thereat upon pulling the adjacent grip tab. However, the heat seal need not extend to at least one edge of the bag and in such case a protrusion or extension of the heat seal or weld can be formed intermediate the length thereof to form a tear initiation means. As shown in FIG. XII, the heat seal or weld 57 is formed with a projecting point 58 which extends in the direction of the bag enclosure. Upon gripping and pulling of the grip tab 59 up and away from the bag enclosure, the tear initiates at the point 58 and proceeds away from it in two directions along the lower or inner edge of heat seal 57.

It is apparent that bags embodying the features of this invention can easily be filled using conventional bag filling and sealing equipment. Closure of bags formed in accordance with the invention is effected simply by uniting panels forming the bag enclosure with the tear strip in a unitary multi-ply weld. This can be done by any suitable equipment capable of supplying sufficient heat and pressure to form a weld or heat seal between all of the elements. Closure of the bag can involve "prefabrication" of the tear tab to the bag in a separate operation prior to final sealing of the bag.

Those modifications and equivalents which fall within the spirit of the invention and the scope of the appended claims are to be considered part of the invention.

I claim:
1. A bag comprising a plurality of panels composed of a material fusible above a predetermined temperature which when joined form an enclosure for receiving items to be packaged, a tear strip of heat-fusible material lying against one of said panels and having a portion thereof free to form a grip tab, a curved substantially semicircular heat seal intersecting one side of said bag at two locations and integrally joining said tear strip and all of said panels forming said bag enclosure.

2. A bag construction comprising two separate bag enclosures formed of a plurality of panels composed of a material fusible above a predetermined temperature, a tear strip of heat-fusible material lying against a panel of each of said bag enclosures and having a portion thereof free to form a grip tab, a curved substantially semicircular heat seal integrally joining said tear strip to all of the panels forming each of the said bag enclosures, said heat seal extending to at least one edge of each of said bag enclosures.

3. A bag construction comprising two separate bag enclosures formed of a plurality of panels composed of a material fusible above a predetermined temperature, a tear strip of heat fusible material lying against a panel of each of said bag enclosures and having a portion thereof free to form a grip tab, a heat seal integrally joining said tear strip to all of the panels forming each of the said bag enclosures, said heat seal line extending to at least one edge of each of said bag enclosures and forming a boundary between each of the said bag enclosures and permitting the opening of one bag enclosure along the edge of said heat seal while preserving the remaining bag enclosure intact.

4. A bag comprising a plurality of panels composed of a material fusible above a predetermined temperature which when joined form an enclosure for receiving items to be packaged, said panels having a projecting flap portion which extends beyond the area of the bag enclosure, a portion of said projecting flap being folded back to lie against a panel forming said bag enclosure, a heat seal integrally joining said folded back flap portion to all of the panels forming said bag enclosure and extending to at least one edge of said bag enclosure.

5. A bag comprised of two separate panels formed of a material fusible above a predetermined temperature, a heat seal joining said panels in a unitary 2-ply construction along three sides of said panels, a strip of heat-fusible material lying against one of said panels adjacent the edge thereof which is not heat sealed to the second panel, a second heat seal joining said front and back panels with said strip in a unitary 3-ply weld, said strip having a portion thereof free to form a grip tab.

References Cited

UNITED STATES PATENTS

| | | | |
|---|---|---|---|
| 2,643,049 | 6/1953 | Bartelt | 229—51 |
| 3,170,619 | 2/1965 | Repko | 229—62 |

THERON E. CONDON, *Primary Examiner.*

FRANKLIN T. GARRETT, *Examiner.*

J. B. MARBERT, *Assistant Examiner.*